(12) United States Patent
Rajsic

(10) Patent No.: US 7,701,860 B2
(45) Date of Patent: Apr. 20, 2010

(54) CONTROL PLANE STABILITY IN COMMUNICATIONS NETWORKS

(75) Inventor: Carl Rajsic, Nepean (CA)

(73) Assignee: Alcatel Lucent, Paris (FR)

( * ) Notice: Subject to any disclaimer, the term of this patent is extended or adjusted under 35 U.S.C. 154(b) by 1376 days.

(21) Appl. No.: 10/369,539

(22) Filed: Feb. 21, 2003

(65) Prior Publication Data

US 2004/0165535 A1 Aug. 26, 2004

(51) Int. Cl.
*H04L 12/26* (2006.01)
(52) U.S. Cl. .................................. 370/248; 370/401
(58) Field of Classification Search .................. 370/241, 370/242, 244, 245, 248, 249, 400, 401, 409; 709/220–224
See application file for complete search history.

(56) References Cited

U.S. PATENT DOCUMENTS

| | | | | |
|---|---|---|---|---|
| 6,147,971 A | * | 11/2000 | Rochberger et al. | 370/238 |
| 6,223,149 B1 | * | 4/2001 | Margulis et al. | 703/27 |
| 6,229,787 B1 | * | 5/2001 | Byrne | 370/218 |
| 6,473,408 B1 | | 10/2002 | Rochberger et al. | |
| 6,532,237 B1 | * | 3/2003 | Or et al. | 370/396 |
| 6,697,329 B1 | * | 2/2004 | McAllister et al. | 370/235 |
| 7,039,014 B1 | * | 5/2006 | Krishnamurthy et al. | 370/244 |
| 7,177,951 B1 | * | 2/2007 | Dykeman et al. | 709/249 |
| 2002/0071391 A1 | | 6/2002 | Ishioka | |

FOREIGN PATENT DOCUMENTS

EP 1 006 752 A 6/2002

* cited by examiner

*Primary Examiner*—Pankaj Kumar
*Assistant Examiner*—Duc T Duong
(74) *Attorney, Agent, or Firm*—Kramer & Amado, P.C.

(57) ABSTRACT

A method and apparatus for establishing a test connection to verify the ability to automatically re-establish control plane connections, if necessary, in a PNNI network. Certain routing features such as restricted transit feature and policy based routing features or the current stat of the network itself can limit access to nodes and links between nodes. If these features are implemented in a network or the network state changes after a control plane connection has been established, then these changed conditions will not affect the current connection but may prevent the re-establishment of the connection if it is unintentionally dropped. According to the invention a test connection is periodically set-up through the network and if the test connection fails an alarm or other notice is given. This allows for preventative action to be taken in order to avoid disruption to the network.

20 Claims, 4 Drawing Sheets

CONTROL PLANE STABILITY IN COMMUNICATIONS NETWORKS

FIELD OF THE INVENTION

The present invention relates to the field of data communications networks, and more particularly to systems and methods of monitoring the stability of the control plane in such networks.

BACKGROUND

Switching systems (also referred to as "switching networks") route data through and among data communications networks. Switching systems typically comprise a plurality of switches and clusters of switches ("nodes") that provide data communications paths among elements of data communications networks.

The "topology" of a switching network refers to the particular arrangement and interconnections (both physical and logical) of the nodes of a switching network. Knowledge of the topology of a switching network is used to compute communications paths through the network.

For switching systems that comprise a small number of individual switches, the topology is fairly straightforward and can be described by identifying the individual nodes in the system and the communications links between them. For larger and more complex networks, however, the amount of data needed to identify all links between all nodes of the network can be quite extensive.

A number of approaches have been proposed to reduce the amount of information needed to describe the topology of complex switching networks. One approach involves grouping physical nodes into groups ("peer groups") that are viewed as individual logical nodes ("logical group nodes") having characteristics that comprise an aggregation of the characteristics of the individual nodes within the group. Such logical group nodes may be further grouped with other physical and/or logical nodes to form successively higher level peer groups, creating a hierarchy of peer groups and logical group nodes.

One example of a network that allows physical nodes to be grouped into levels of logical groups of nodes is a "PNNI" network. PNNI, which stands for either "Private Network Node Interface" or "Private Network Network Interface," is a routing and signaling protocol developed by the ATM Forum. The PNNI routing protocol is used to distribute topology information between switches and clusters of switches within a private ATM switching network. The PNNI signaling protocol is used to set up data connections within the PNNI network, via signaling call setup messages through the network.

A PNNI network is a network that utilizes the PNNI routing and signaling protocol. Within the PNNI routing protocol a Logical Group Node (LGN) is an abstract representation of a lower level Peer Group (PG) as a single point for the purposes of operating at one level of the PNNI routing hierarchy. Logical Group Nodes are created in a switching system via configuration and become operational dynamically as a result of the PNNI routing protocol behavior. Within the PNNI routing hierarchy a lowest level node is an abstraction representing a single instance of the PNNI routing protocol. Lowest level nodes are created in a switching system via configuration and are always operational. An LGN or a lowest level node is also known as a logical node or a node for the purpose of the present application.

The PNNI routing protocol is used typically in ATM products to distribute information about changing network topology and network resources among a group of associated switches. Topology information is organized and distributed in a hierarchical fashion, or a flat single peer group, depending on the network topology. Hierarchy allows networks to scale their topologies to a very large number of nodes. The PNNI implementation provides the required support to exist and participate in the multilevel hierarchical network.

In a hierarchical network, nodes in the PNNI routing domain are grouped into peer groups. Nodes in the same peer group elect a peer group leader. The peer group leader is responsible for activating a logical group node (LGN) at the second level of hierarchy as well as existing as the logical node in the lowest level. The newly activated LGN exchanges PNNI routing information with other neighbor LGNs at the second level of hierarchy. The neighbor LGNs are other LGNs that other lower level PGLs instantiated from adjacent peer groups. In addition to exchanging information the LGN propagates information from higher levels down into the lower level peer group via the PGL that instantiated it. This is so that all nodes in the lower level peer group have the same information about the other LGNs in the higher level peer group where the activated LGN exists. From the hierarchical topology information gathered by a node, routing tables are created and used by the switches to route calls using the PNNI signaling protocol. PNNI networks and hierarchical groupings are described in co-pending U.S. application entitled "Method for Advertising Reachable Address Information in a Network" the contents of which are incorporated herein by reference.

In the present invention, networks use a logical hierarchical grouping of nodes, e.g. PNNI enabled ATM networks, to reduce the amount of routing information that is distributed and stored throughout the network. More specifically, the invention is directed to the problem of ensuring the stability of the control plane, particularly SVCC routing control channel (RCC) connections. These connections are set up between PNNI peer group leader (PGL) nodes (or logical nodes in higher level peer groups) in different peer groups (PG) to exchange information (e.g. routing, topology, and reachability information) between the groups. With the introduction of new and future features such as Restricted Transit and Policy-based Routing, limitations and additional criteria are placed on the routing and establishment of connections. Ensuring that SVCC-RCC connections are not adversely affected by provisioning changes made to the network to support these features is and will be very important to guaranteeing high levels of network reliability, availability, and serviceability (RAS), since SVCC-RCC connections are integral to the PNNI control plane.

Ensuring that SVCC-RCC connections are not adversely affected by provisioning changes has not as yet been addressed in the industry mostly because SVCC-RCC connections typically require little attention after they have been created. They are created when a PNNI PGL node is elected and remain established while the network is operating. However, if an SVCC-RCC connection were to be dropped, e.g. because of an equipment failure or maintenance action, features like Restricted Transit and Policy-based Routing could prevent the connection from being re-created, which would negatively impact network services since the PNNI control plane would not come back up. As route and connection establishment limiting features such as Restricted Transit and Policy-based Routing become more prevalent in networks, and as the number of SVCC-RCC connections in large networks continues to increase into the hundreds, ensuring SVCC-RCC connections remain unaffected by provisioning changes will gain more attention in the industry.

There is, therefore, a need to provide systems and methods of monitoring the control plane in networks such as PNNI networks.

SUMMARY OF THE INVENTION

Therefore, in accordance with a first aspect of the present invention there is provided a method of monitoring effects of provisioning changes on control communications in a data communications network, comprising the steps of: a) identifying a connection used for control communications in the network; b) determining nodes and links over which the connection is routed; c) attempting to establish a test connection of the same type and over any available nodes and links in the network and d) reporting, responsive to failure of the attempt, an indication of a result of the attempt.

In accordance with a second aspect of the present invention there is provided an apparatus for monitoring effects of provisioning changes on control communications in a data communications network, comprising: a) means for identifying a connection used for control communications in the network; b) means for determining nodes and links over which the connection is routed; c) means for attempting to establish a test connection of the same type and over any available nodes and links as the connection; and d) means for reporting, responsive to failure of the attempt, an indication of a result of the attempt.

BRIEF DESCRIPTION OF DRAWINGS

The invention will now be described in greater detail with reference to the attached drawings wherein.

DETAILED DESCRIPTION OF THE INVENTION

Figure 1:
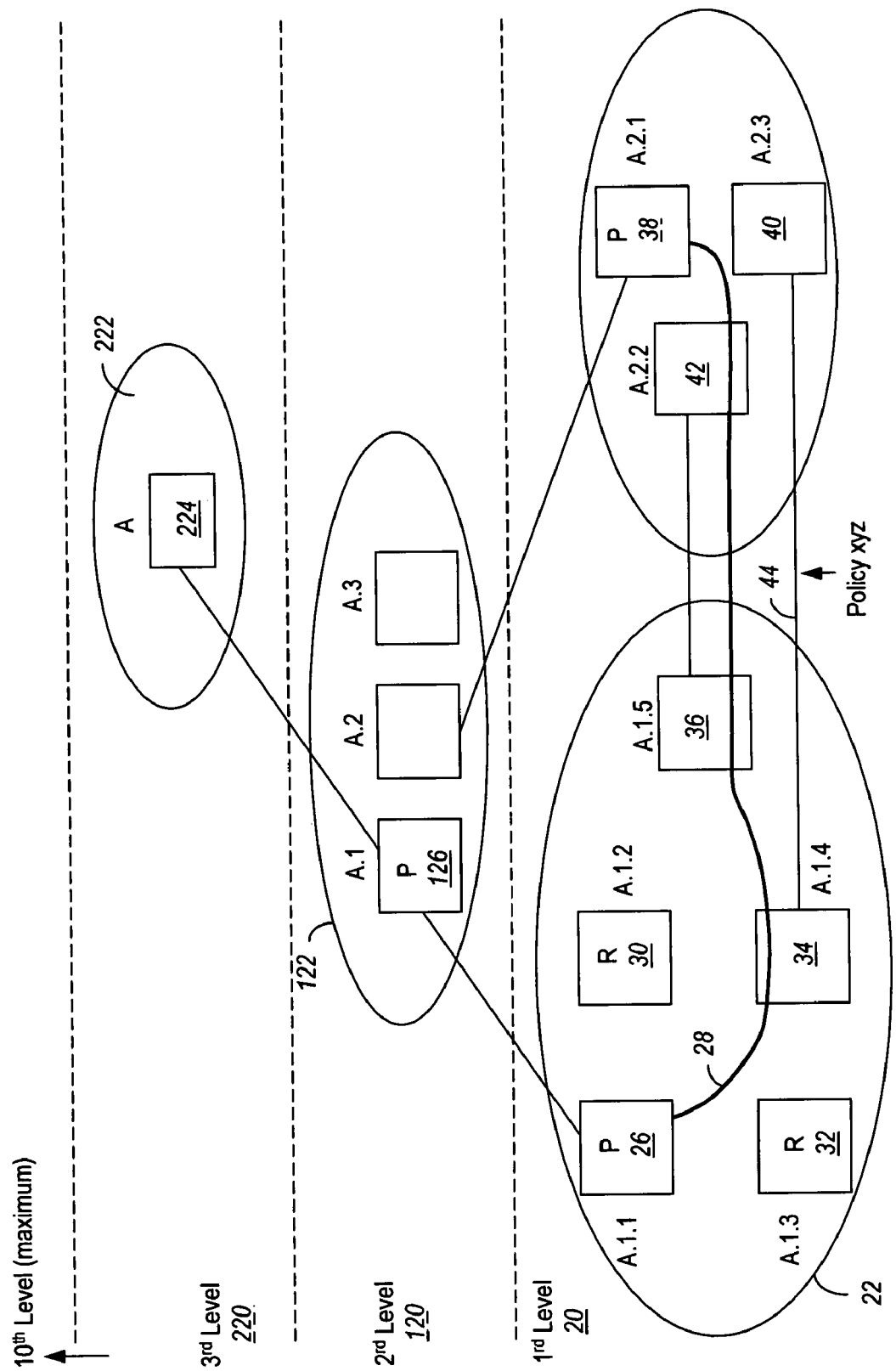
FIG. 1 is a logical representation of a PNNI hierarchy according to the prior art.

FIG. 1 shows a logical representation of PNNI hierarchy in an ATM network. As shown in FIG. 1, a node 26 having an address A.1.1 is configured as a lowest level node in the first level 20 of the hierarchy. There can be up to ten such levels according to ATM PNNI specifications. The node 26 having address A.1.1 is located in the child peer group (PG) 22, and the parent PG 122 has node 126 having an address A.1. Parent PG 122 in the second level 120 has grand parent peer group 222 in the third level 220. Node 224 having address A is in PG222. The child peer group 22 includes other nodes 30, 32, 34 and 36 having addresses A.1.2, A.1.3, A.1.4, and A.1.5 respectively. Node 26 is marked with "P" to denote that it is the peer group leader (PGL) in the child PG 22 and therefore is responsible for running the LGN 126 in the parent PG 122. Node 26 (A.1.1) is elected by its peer nodes according to a PGL election algorithm based on a configured PGL priority assigned to each node. Parent PG 122 in level two containing PGL 126 is instantiated on lower level node 26 (A.1.1).

Nodes 30 and 32 (A.1.2 and A.1.3) are marked with "R" to denote that they have been configured to be Restricted Transit nodes as defined in the PNNI specification Version 1.1 af-pnni-0055.002. When Restricted Transit is provisioned on a node, calls originating from other nodes are not allowed to transit the restricted transit node, however, calls may still originate and terminate on that node. If calls already transit the node before the Restricted Transit feature is provisioned on the node, those existing calls will not be affected by provisioning the node to be a restricted transit node. If one of these calls is dropped, however, attempts to re-establish it on the node that originated the calls would avoid transiting the restricted transit node and would therefore find an alternate path (if one exists) around the restricted transit node. In the case of an SVCC-RCC connection, failure to re-establish the connection as a result of a node being configured with restricted transit would be service affecting and would result in a large number of calls not being able to establish since the PNNI control plane at higher levels of hierarchy would stop operating without the SVCC RCC connection succeeding.

The link 44 between nodes 34 and 40 (A.1.4 and A.2.3) has been configured to support calls that signal policies, as defined by the policy-based routing feature currently being defined in the ATM Forum (str-cs-policy-01.00). The policies that are supported on link 44 between nodes 34 and 40 are represented by "policy XYZ" in the figure and indicate that the link has been tagged to support calls that signal policies X, Y, or Z. Tagging links with policies implies that only calls that have specified a policy that matches the link's tagged policies are allowed to be set up on the link. However, if calls already transit the link before the policy-based routing feature is provisioned on a link, these existing calls will not be affected by provisioning policies, regardless of whether or not they have the specified policy originally. However, if one of these calls that did not originally signal a policy (and will not signal a policy) is suddenly dropped, the node that originated the calls would avoid this tagged link and would therefore find an alternate path (if one exists) around the link with policies where the call will succeed (since the call does not signal the required policy to traverse the newly tagged link). In the case of an SVCC-RCC connection, failure to re-establish the connection due to newly tagged links with policies when the SVCC-RCC does not signal policies would be service affecting for a large number of calls, similar to an SVCC-RCC being affected by restricted transit as mentioned previously.

In FIG. 1 the PGL nodes 26 and 38 (A.1.1 and A.2.1) have an SVCC-RCC connection 28 between them that transits nodes 34, 36 and 42 (A.1.4, A.1.5, and A.2.2). If restricted transit or policy routing features are provisioned on enough nodes or links that subsequently blocks all paths between nodes 26 and 38, then attempts to re-establish the connection if it were lost would fail. Furthermore, since the current path is the only allowed route for the SVCC-RCC connection due to features provisioned on the other nodes and links, if restricted transit and policy routing were configured on enough network elements to cause the path to be blocked, then the connection could not be re-routed without changing the provisioning on the other nodes and links.

The problem of ensuring that existing SVCC-RCC connections are not affected by network provisioning changes is not addressed in the prior art. If one were to address this problem, the only option currently available to deal with it is to manually track the nodes and links that an SVCC-RCC connection transits to make sure that the connection is not adversely affected by provisioning changes or bandwidth utilization on links that now restrict an SVCC-RCC from being established. Provisioning changes is one case which is described above, however, it should be noted that the links could also run out of bandwidth meaning there would be no room for the bandwidth requirements of the SVCC-RCC and it would fail in that case as well. Since there are commonly hundreds of these connections in typical ATM networks this manual approach is not a viable option.

Figure 2:
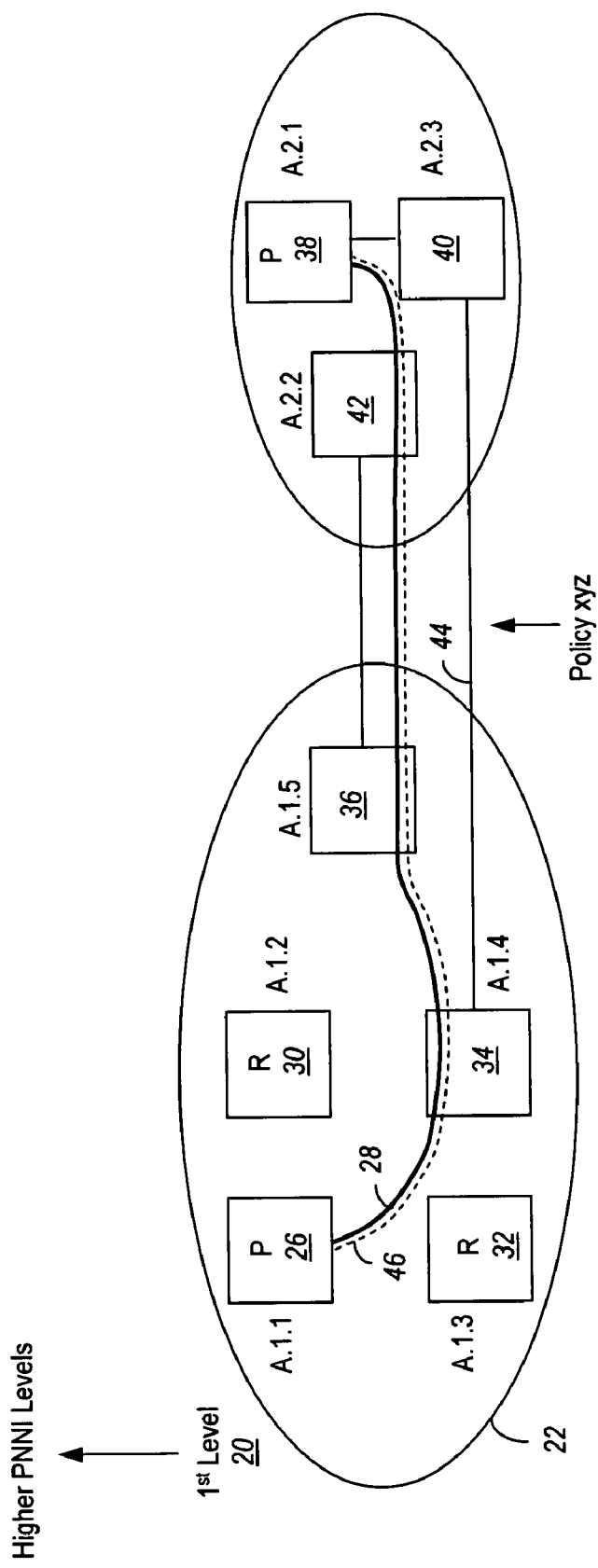
FIG. 2 shows a test connection in a first level peer group having restricted transit feature and policy based routing feature.

FIG. 2 shows the first PNNI level 20 of FIG. 1. Referring to FIG. 2, the invention defines a test SVCC-RCC 46 connection that is shown as a dashed line (before node 34 is configured as a restricted transit node). According to the invention, at periodic intervals a test SVCC-RCC connection (46) is established to verify that if the current SVCC-RCC connection 28 were to go down, it could be automatically re-established without interference from any provisioning changes (or other network scenarios that could affect the SVCC-RCC) that may have occurred since it was first created. The periodic interval is configured by the operator and may be in the range of 0 to 10080 minutes (1 week). A value of 0 implies the diagnostic test feature is turned off. The type of provisioning changes that would be problematic are provisioning of Restricted Transit on the nodes and provisioning of Policy-based Routing on links that the current SVCC-RCC transits, however, other network scenarios can occur that also affect the ability of the SVCC-RCC connection 46 to be established if it were to fail. Note that the test SVCC-RCC does not alter the state of the current SVCC-RCC connection 28. If creation of the test SVCC-RCC connections fails then a status indication is returned to the network operator indicating a problem that the SVCC-RCC will experience if it were to fail. The operator would then have the opportunity to take actions to correct the situation. Such actions might include, changing configurations of the features that affected the test SVCC-RCC or adding network capacity to provide additional alternate routes for the SVCC-RCC. If creation of the test SVCC-RCC connection is successful then the test connection is taken down and no further action is necessary since a path exists between the PGLs that can be used if the current SVCC RCC fails. The test SVCC-RCC connection is merely a means of detecting conditions in the network that put the control plane at risk.

Figure 3:
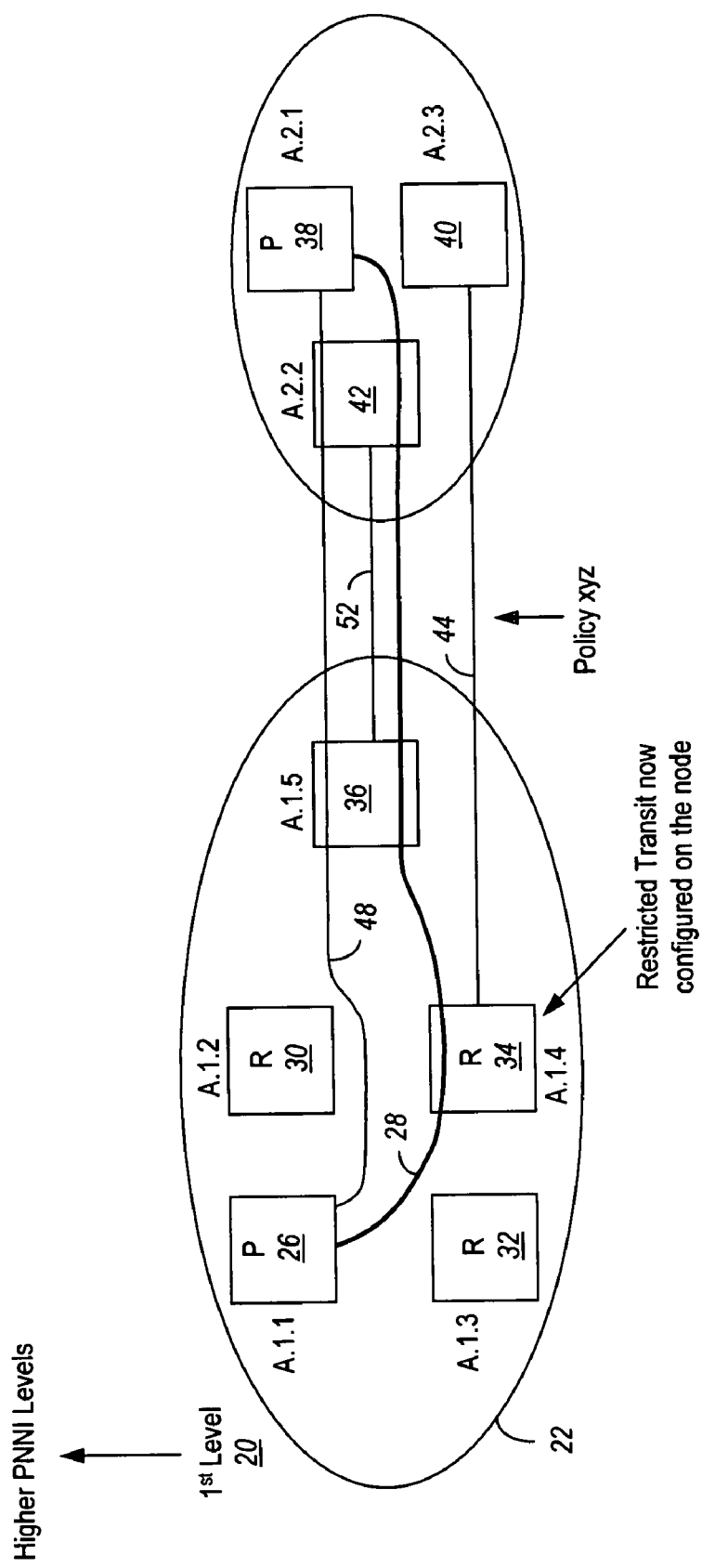
FIG. 3 illustrates an alternate test connection in the first level peer group of FIG. 2.

FIG. 3 shows a second test SVCC-RCC connection 48, which is represented as a dotted line. This second test SVCC-RCC connection 48 follows a similar route as the SVCC-RCC connection, however it circumvents the node 34 (A.1.4) after the node 34 is configured as a restricted transit node. This second test SVCC-RCC connection 48 demonstrates that the there is still a viable route between the PGLs for the SVCC-RCC connection to establish even after node 34 (A.1.4) is configured as a restricted transit node.

Figure 4:
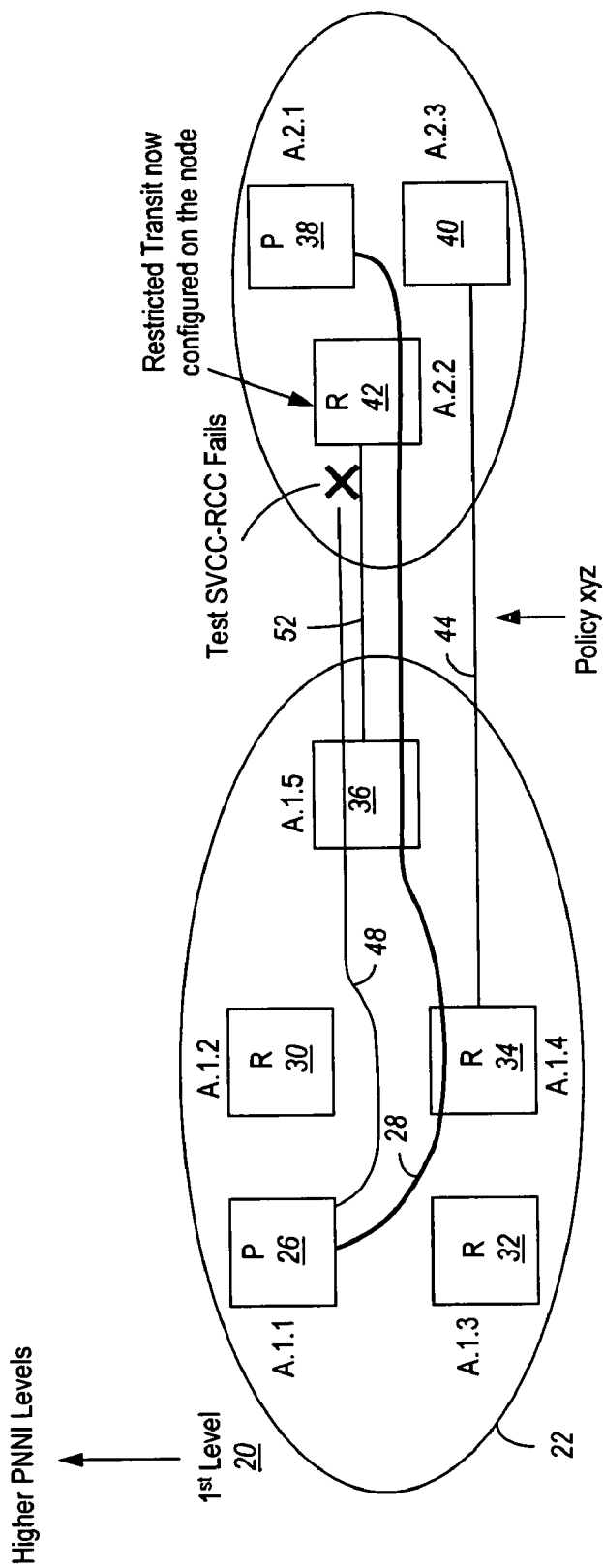
FIG. 4 shows the effects of a test connection failure.

FIG. 4, shows how the test SVCC-RCC 48 detects a potential problem with the current SVCC-RCC connection 28 if node 42 (A.2.2) were to be configured as a restricted transit node. Note that all nodes in PG 22 do not have knowledge that node 42 (A.2.2) is configured as a restricted transit node and may therefore attempt to send calls over link 52 between nodes 36 and 42 (A.1.5-A.2.2). Since there is now no available path between the PGLs, the test SVCC RCC connection 48 fails at node 42 (A.2.2), because it is now a restricted transit node (even though the current SVCC-RCC connection 28 is up and undisturbed). Since the test SVCC-RCC connection 48 fails, the operator is notified and can re-configure the network or build more alternate paths between these peer groups to allow the test SVCC-RCC to succeed (and therefore, ensure the current SVCC-RCC can be re-establish if it fails).

The present invention provides an automatic means of ensuring that the control plane of PNNI networks is not put at risk by network provisioning changes. Since the only options in the prior art is to perform this function manually, the invention provides the usual advantages that arise from automation, i.e. more time-efficient, less-error prone, less costly, etc. Although restricted transit and policy routing features in PNNI are described it is to be understood that the invention relates to any random protocol that supports dynamically established control plane connections that need to be monitored in such a way to ensure they are not adversely affected.

The invention provides a solution to a problem that is not currently being addressed in the industry. However, the importance of the problem will increase as ATM network grow in size and as the use of route-enhancing features like Restricted Transit and Policy-based Routing becomes more prevalent.

Although particular embodiments of the invention have been described and illustrated it will be apparent to one skilled in the art that numerous changes can be made without departing from the inventive concept. It is to be understood, however, that such changes will fall within the full scope of the invention as defined in the appended claims.

I claim:

1. A method of monitoring effects of a provisioning change to node policies among given policy types in a data communications network or to a communication link between two nodes, comprising
   a) identifying an existing communication connection between two pair group leader (PGL) nodes in the network, said identifying including identifying the policy type of said communication connection;
   b) determining nodes and links over which the existing communication connection is routed;
   c) attempting to create a test connection between the two PGL nodes of the same type as said communication connection and over any available nodes and links in the network;
   d) responsive to failure of the attempt, reporting to the network operator an indication of a result of the attempt.

2. The network of claim 1 wherein the data communications network is an ATM network.

3. The method of claim 2 further comprising repeating the steps a) to d) at a predetermined periodic interval.

4. The method of claim 3 wherein the step a) comprises identifying a PNNI routing control channel (RCC) connection.

5. The method of claim 4 wherein the step a) further comprises identifying a switched virtual connection (SVCC) type PNNI RCC connection.

6. The method of claim 2 wherein the step a) comprises identifying a PNNI routing control channel (RCC) connection.

7. The method of claim 6 wherein the step a) further comprises identifying a switched virtual channel connection (SVCC) type PNNI RCC connection.

8. The method of claim 2 wherein the step d) comprises raising an alarm.

9. The method of claim 8 wherein the step d) further comprises determining an alternate route for the connection and reporting existence of the alternate route.

10. The method of claim 8 wherein the method further comprises the step of determining an alternate route for the connection and reporting existence of the alternate route.

11. The method of claim 1 further comprising the step e) of repeating the steps a) to d) at a predetermined periodic interval.

12. The method of claim 1 wherein the step a) comprises identifying a PNNI routing control channel (RCC) connection.

13. The method of claim 12 wherein the step a) further comprises identifying a switched virtual channel connection (SVCC) type PNNI RCC connection.

14. The method of claim 11 wherein the step a) comprises identifying a PNNI routing control channel (RCC) connection.

15. The method of claim 11 wherein the step a) further comprises identifying a switched virtual connection (SVCC) type PNNI RCC connection.

16. The method of claim 1 wherein the step d) comprises raising an alarm.

17. The method of claim 16 wherein the step d) further comprises determining an alternate route for the connection and reporting existence of the alternate route.

18. An apparatus for monitoring effects of a provisioning change to node policies among given policy types in a data communications network, comprising:

a) means for identifying a connection (PGL) nodes used for control communications in the network, said identifying including identifying the policy type of said connection;
b) means for determining nodes and links over which the connection is routed;
c) means for attempting to create a test connection between the two PGL nodes of the same type as said identified existing communication connection and over any available nodes and links in the network;
d) means responsive to failure of the attempt for reporting to the network operator an indication of a result of the attempt.

19. The apparatus of claim 18 wherein the reporting performed by said means for reporting includes an alarm.

20. The apparatus of claim 18 wherein the means for reporting has means to determine an alternate Previously Presented route for the connection and reporting the existence of the alternate route.

* * * * *